Patented May 2, 1939

2,156,365

UNITED STATES PATENT OFFICE 2,156,365

PRODUCTION OF HIGHLY ACTIVE METAL CARBIDES

Thomas H. Vaughn, Niagara Falls, N. Y., assignor to Union Carbide and Carbon Research Laboratories, Inc., a corporation of New York No Drawing. Application April 14, 1937,
Serial No. 136,814

16 Claims. (Cl. 23—208)

This invention relates to the activation of alkaline earth metal carbides and the production of alkali metal carbides; and more particularly it concerns the production of alkali metal carbides from calcium carbide by a high temperature treatment thereof with certain alkali metal compounds under regulated conditions. It has special utility in connection with the production from calcium carbide of highly reactive mixtures having a high content of sodium carbide, and adapted for many uses, such as for starting materials in the production of acetylenic compounds. The grades of calcium carbide employed in commerce are not sufficiently active for use for many purposes for which the much more active alkali metal carbides are well adapted. Nevertheless the use of the latter in industry has heretofore been greatly limited because of their high cost of manufacture, involving the use of acetylene and metallic sodium or potassium as starting materials.

The present invention is based in important part upon applicant's discovery that by heating either crude commercial or pure calcium carbide or other alkaline earth metal carbide, with certain alkali metal compounds, such as the oxides, hydroxides, sulfides, carbonates, and chlorides, under certain selected conditions, substantial portions at least of the carbide can be converted to the highly active alkali metal carbide, frequently with yields of the latter very close to the theoretical. For example, when calcium carbide is mixed with sodium monoxide at room temperature no reaction occurs. Upon raising the temperature of the mixture to between 200° and 250° C.,—depending to some extent upon the particle size of the reactants,—reaction sets in with formation of sodium carbide in accordance with the equation:

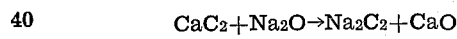
$$CaC_2 + Na_2O \rightarrow Na_2C_2 + CaO$$

At temperatures up to around 800° C. this equation represents the major reaction occurring. At higher temperatures metallic sodium and carbon are the principal products of the reaction, and the reaction may be formulated as:

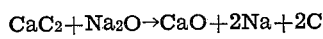
$$CaC_2 + Na_2O \rightarrow CaO + 2Na + 2C$$

According to one modification of the invention an alkaline earth metal carbide is reacted with an alkali metal oxide or hydroxide at a temperature within the range from around 200° to around 800° C., preferably in an atmosphere of inert gas and under atmospheric pressure in a closed vessel. While it is preferred for the sake of expediency to use sodium monoxide, sodium sulfide, or sodium hydroxide as one of the reactants,—or a mixture of these, with or without the corresponding compounds of other alkali metals,—it is possible to use the corresponding potassium compounds alone; or to use the alkali metal peroxides. However, when using the potassium compounds, or the said peroxides, the reaction is highly energetic and is difficult to control.

Even in the case of sodium monoxide, its reaction with calcium carbide is highly exothermic, so that when allowed to complete itself in a relatively short time, large increases in the temperature of the reaction mass may occur. Care must be taken to prevent a temperature above around 800° C. from being reached, since at such higher temperatures metallic sodium and carbon are the principal products formed. It has been found, in instances when a muffle furnace was used, and where the temperature was not controlled, that the amount of heat liberated was sufficient to raise the temperature of the entire furnace by some 100 to 150° C.; so that the temperature of the reaction mixture itself may go above 800° C. unless this is guarded against.

Applicant has found that the rate and extent of reaction can be controlled by adjusting the particle size of the reactants. For example, when mixtures of extremely finely-divided calcium carbide and sodium monoxide are heated to around 225° C., the reaction may be so vigorous that considerable metallic sodium is produced at the expense of the sodium carbide. By using both reactants in a coarse condition, or by using finely-divided sodium monoxide with coarse carbide, the reaction often does not go to completion, apparently due to the formation of surface coatings on the carbide. However, by reacting finely-ground calcium carbide with coarse sodium monoxide or the equivalent, as indicated in Example 2 appearing hereinafter, the reaction goes to completion, and the reaction mixture temperature is maintained within very close limits.

When using sodium hydroxide as one of the reactants in an atmosphere of nitrogen, temperatures at least as high as about 250° C. are required for satisfactory operation; whereas, when using sodium monoxide, temperatures within the range from around 200° C. and around 800° C. may be utilized advantageously. Within this temperature range the yield of sodium carbide decreases slightly with increased temperature.

The following examples will serve to illustrate the invention:

*Example 1.*—Twelve hundred and seventy-five grams of commercial calcium carbide which had been ground to 100-mesh x dust and which contained 75% of calcium carbide was mixed with 930 grams of sodium monoxide and ground in a ball mill for three hours. The mixture was screened to remove the balls and transferred in an atmosphere of nitrogen into a one-gallon tin container. A small hole was made in the top of the container and the mixture placed in a muffle furnace and heated to 225° C. for two hours. On removing from the furnace the small breather hole was sealed and the mixture allowed to cool to room temperature. The solid mass was reduced to about ½-mesh by passage through a set of spiked rolls flushed with nitrogen and ball-milled in nitrogen for two hours. An analysis of the mixture indicated that 61% of the calcium carbide had been converted and remained in the reaction mixture as sodium carbide.

Example 2.—Three hundred and nineteen grams of commercial calcium carbide which had been ground so that 100% passes through a 100-mesh screen having openings of .15 mm. and which contained 75% of $CaC_2$ was mixed with 264 grams of sodium monoxide having a particle size of from 0.3 to 1 mm. The mixture was placed within a metal container as in Example 1 and heated at 300° to 350° C. for two hours in an atmosphere of nitrogen. Under these conditions reaction took place between the two compounds without any substantial increase in temperature and without the decomposition and loss of any large amount of the contained carbide. A yield of sodium carbide equivalent to 95% of the theoretical was obtained.

The crude reaction mixture obtained by this procedure may be used directly for most purposes without any purification. For example, in the preparation of dialkyl acetylenes by treatment of sodium carbide with alkyl halides in liquid ammonia, this crude sodium carbide functions exceedingly well, the mixture giving yields of dialkyl acetylenes, based upon the carbide content, as good or better than those obtained with pure sodium carbide itself.

As already indicated, this crude sodium carbide mixture may also be used as a source of metallic sodium, it only being necessary to heat the crude material to a temperature in excess of 800° C. at atmospheric pressure in order to obtain high yields of metallic sodium.

Example 3.—A mixture of 2 mols of flake sodium hydroxide and 1 mol of 20-mesh calcium carbide was heated and reacted at temperatures between 360° and 400° C. for around five minutes, the temperature being readily maintained within these limits. A yield of around 50% of sodium carbide was secured.

By using a molar ratio of sodium hydroxide to calcium carbide of 1:1 much similar results are obtained. Thus in such an operation conducted at a maximum temperature of 533° C., a yield of 40% of sodium carbide was secured.

When intimate mixtures of a finely-ground alkaline earth metal carbide and an alkali metal oxide or hydroxide are handled or stored, this must be done under anhydrous conditions. Even small amounts of water, such as moisture present in the atmosphere, are sufficient to initiate local reaction, which then spreads through the entire mass and may, under certain conditions, become violent.

Applicant now has further discovered that alkali metal carbides may be produced by reacting calcium carbide and the corresponding alkali metal sulfide. Temperatures between around 300° and around 500° C. under atmospheric pressure are especially suitable when using sodium sulfide, although the reaction may be conducted at temperatures as high as 800° C. The rate of reaction may be controlled by regulating the particle size of the reactants. Preferably a relatively coarsely-ground sodium sulfide is intimately mixed with a more finely-ground carbide, giving a slower more readily controllable reaction than when both of the reactants are finely divided. Thus:

Example 4.—Two hundred grams of anhydrous sodium sulfide, of particle size, such that 100% passes through a 16-mesh screen having openings of .99 mm. was mixed with 228 grams of a commercial grade of calcium carbide containing around 75% calcium carbide previously ground so that 100% passes through a 100-mesh screen having openings of .15 mm. The mixture was placed in a container having a breather opening, and was heated in a muffle furnace for one hour within a temperature range from 380° to 460° C. The resultant reaction mixture contained around 98% of its carbide content, a large portion of which was in the form of highly active sodium carbide.

The crude reaction mixture may be used for many purposes without further treatment, as in the production of acetylenic alcohols and related compounds, or for the production of metallic sodium, etc.

Sodium carbonate when heated in intimate admixture with finely-divided calcium carbide at temperatures within the range from around 500° C. to near but below 800° C. reacts with the latter and produces sodium carbide in substantial yields. The use of temperatures in excess of 800° C. leads to the formation of metallic sodium rather than sodium carbide.

Example 5.—An equimolecular mixture of calcium carbide and anhydrous sodium carbonate was finely ground in a ball mill and then placed within a steel container. The latter was heated at 600° C. for three hours in a muffle furnace, after which the mixture was permitted to cool to room temperature. The reaction product was jet black in color, and was moderately active towards both water and absolute alcohol. It contained no metallic sodium or calcium,—as indicated by extraction with liquid ammonia. Considerable carbon was present; and a substantial amount of the total carbide present was in the form of sodium carbide, the balance being calcium carbide. The sodium carbide content was determined by reacting the product with amyl chloride in liquid ammonia with the production of diamyl acetylene.

The direct heating of an intimate finely-divided mixture of sodium chloride and calcium carbide yields no reaction below the dissociation temperature of sodium carbide. However, it has been found that, by the use of a solvent for the sodium chloride which is capable of wetting calcium carbide and which is molten at temperatures under 800° C., upon heating the mixture to temperatures of between 575° and 700° C. a reaction occurs with the formation of sodium carbide in accordance with the equation:

$$2NaCl + CaC_2 \rightarrow CaCl_2 + Na_2C_2$$

Thus:

Example 6.—A mixture of 630 grams of calcium chloride, 420 grams of calcium carbide, and 285 grams of sodium chloride was ground in a ball mill, and then heated at 700° C. in a crucible in a furnace for two hours. The resultant fused product was chilled, and reground. It was active toward water and absolute alcohol; and it contained sodium carbide, as evidenced by treating the fused ground product with amyl chloride in liquid ammonia for several hours at room temperature, and measuring the amyl acetylenes thus produced.

Other procedures may be used. For example, a stoichiometric mixture of sodium chloride and calcium carbide may be added to a molten sodium chloride-calcium chloride eutectic maintained at between 575° and 700° C. Other solvents of the type named may be used, such as the barium chloride-sodium chloride eutectic.

The activated carbide or alkali metal carbide-containing mixture prepared in accordance with the present invention is highly reactive with primary alkyl halides in liquid ammonia with the production of alkyl acetylenes. The alkali metal carbide content of the reaction product can be identified as follows: The former is spontaneously inflammable in moist air, and reacts explosively with water in manner similar to pure sodium carbide; when the reaction product is suspended in liquid ammonia it reacts with alkyl halides with the formation of dialkyl acetylenes, whereas calcium carbide does not undergo such reaction under a wide variety of conditions. The reaction product undergoes a complete decomposition into carbon and the alkali metal per se when heated to 800° C.,—the same as does pure sodium carbide. The total carbide content of the product is determined by treating the latter with an aqueous solution of ethanol (the latter being used to moderate the reaction) and analytically determining the amount of acetylene evolved. The sodium or other alkali metal carbide content of the product is determined by suspending the product in liquid ammonia and treating it with amyl chloride in an autoclave. The reaction product is hydrolyzed with water, and the two liquid layers thus formed are separated. The upper layer is washed with water, slightly acidified with hydrochloric acid, and fractionally distilled, and the yield of amylacetylenes determined. Thus, to 724 grams of a mixture obtained by interaction of calcium carbide and sodium monoxide, suspended in 5 liters of liquid ammonia, were added 650 grams of amyl chloride in a steel autoclave, the temperature being permitted to rise to 25° C. while stirring the mixture. After three hours the pressure developed was released and the resultant mixture was hydrolyzed with an excess of water. The mixture was filtered and the filtrate separated in two layers which in turn were separated from each other. The upper layer was washed with 200 cc. of a 10% aqueous solution of HCl, followed with water. The washed liquid was fractionally distilled under vacuum, and the diamyl acetylene boiling at 96° C. under 11 mm. of mercury absolute pressure was separately recovered and measured. Residual diamyl acetylene in the filter cake from the filtrate was recovered by leaching the cake with diethyl ether and recovering the diamyl acetylene from the resultant solution.

The activation of alkaline earth metal carbides or their conversion to alkali metal carbides preferably is conducted under substantially atmospheric pressure; but it will be understood that, if desired, either subatmospheric or superatmospheric pressures may be employed advantageously in the practice of the invention.

The highly reactive products prepared in accordance with the present invention are much more reactive than are alkaline earth metal carbides, not only towards such reagents as primary alkyl halides and dialkyl sulfates in liquid ammonia, but likewise toward a wide variety of common reagents, including water and anhydrous alcohol; and quantitative increases in the activity of the products of this invention over the activity of the original alkaline earth metal carbides towards such reagents are readily observable.

In activations of calcium carbide in accordance with this invention, particularly when employing an alkali metal hydroxide or carbonate, considerable amounts of carbon and of hydrocarbon gases and vapors and hydrogen are produced. The hydrocarbon gases include methane as well as acetylene and other unsaturated compounds, which may be recovered and purified in well known manner. Thus when reacting calcium carbide and an alkali metal hydroxide, the temperature of the mass usually rises from 250° C. to between 400° C. and 600° C., and considerable carbon separates. The gases evolved often contain around 70 to 80% of hydrogen, 15 to 25% of methane, and a few percent of acetylene. Upwards of 72% of the carbon content of the carbide can be obtained in finely-divided, flocculent form, quite suitable for the usual uses to which acetylene blacks are placed. The solid material which remains is very reactive toward water and oxygen, and if introduced into air while yet warm spontaneously ignites. Sodium hydroxide may be partially or completely replaced by potassium hydroxide. However, when the latter is used alone the reaction is very violent and much more difficult to control.

The invention is susceptible of modification within the scope of the appended claims.

I claim:

1. Process for producing a highly-reactive mixture containing an alkali metal carbide, which comprises heating and reacting an alkaline earth metal carbide with an alkali metal compound selected from the group consisting of the oxides, hydroxides, sulfides and carbonates, while preventing the temperature of the reaction mixture from becoming sufficiently high to reduce substantial amounts of alkali metal compounds to the corresponding alkali metal.

2. Process as defined in claim 1, wherein commercial calcium carbide is employed as the alkaline earth metal carbide.

3. Process as defined in claim 1, wherein the said compound is a sodium compound.

4. Process for producing from an alkaline earth metal carbide a highly reactive alkali metal carbide, which comprises heating and reacting an alkaline earth metal carbide with a compound selected from the group consisting of the alkali metal oxides, hydroxides, sulfides and carbonates, while maintaining the mixture at a temperature inhibiting the reduction of the alkali metal compounds to the corresponding alkali metal.

5. Process for producing from an alkaline earth metal carbide a highly reactive alkali metal carbide, which comprises heating and reacting an alkaline earth metal carbide with an alkali metal compound selected from the group consisting of the oxides, hydroxides, sulfides, and carbonates, at a temperature within the range from around 200° C. to around 800° C.

6. Process for producing from an alkaline earth metal carbide a highly reactive alkali metal carbide, which comprises heating and reacting an alkaline earth metal carbide with sodium hydroxide at temperatures within the range between around 250° C. and around 800° C.

7. Process for producing from an alkaline earth metal carbide a highly reactive alkali metal carbide, which comprises heating and reacting an alkaline earth metal carbide with an alkali metal monoxide, while maintaining the reaction mixture within a temperature range between around 200° C. and around 800° C.

8. Process as defined in claim 7, wherein finely-divided calcium carbide and sodium monoxide are employed, and wherein the former is in a finer state of division than the latter.

9. Process as defined in claim 7, wherein calcium carbide of a fineness less than 100-mesh is heated and reacted with a relatively coarse-sized sodium monoxide formed of particles having a fineness of from 0.3 to 1.0 mm.

10. Process for producing from an alkaline earth metal carbide a highly reactive alkali metal carbide, which comprises heating and reacting an alkaline earth metal carbide with an alkali metal sulfide, while maintaining the reaction mixture within a temperature range between around 300° C. and around 500° C.

11. Process for activating an alkaline earth metal carbide which comprises reacting such carbide with a compound selected from the group consisting of the alkali metal oxides, hydroxides, sulfides and carbonates, while maintaining the reactants at a temperature above around 200° C. but sufficiently low to minimize the reduction of the alkali metal compound to form the free metal.

12. Process as defined in claim 11, wherein the first-named compound is a sodium compound.

13. Process as defined in claim 11, wherein calcium carbide is reacted with sodium monoxide at a temperature within the range from around 200° to around 800° C.

14. Process as defined in claim 11, wherein calcium carbide is reacted with sodium hydroxide while maintaining the reaction mixture at a temperature within the range from around 250° C. to around 800° C.

15. Process as defined in claim 11, wherein a mixture of finely-divided calcium carbide of not larger than 100-mesh, and an alkali metal monoxide having a particle size within the range from 0.3 to 1.0 mm. is maintained at a temperature within the range from around 200° C. to around 800° C.

16. Process according to claim 11, wherein calcium carbide is reacted with sodium sulfide at temperatures within the range between around 300° C. and around 500° C.

THOMAS H. VAUGHN.